United States Patent Office 3,069,225
Patented Dec. 18, 1962

3,069,225
METHOD OF INHIBITING CORROSION
Donald L. Andersen, Minneapolis, Minn., assignor to General Mills, Inc., a corporation of Delaware
No Drawing. Filed Jan. 27, 1960, Ser. No. 4,887
1 Claim. (Cl. 21—2.7)

This invention relates to a new and useful method for protecting metallic substances from corrosive action when in contact with a corrosive medium. More specifically, it relates to the use as corrosion inhibitors of compounds represented by the formula $$RNHCH_2CH_2CH_2NHCH_2CH_2CH_2NHR$$

where R is an aliphatic hydrocarbon group containing 6–24 carbon atoms.

Corrosion of metallic substances represents a major industrial problem. Every year the loss to industry through corrosion amounts to millions of dollars. Ferrous metals are generally associated with this problem; however, copper, brass and aluminum are also affected to a lesser degree. In general corrosion takes place when the metalic substance comes in contact with a watery media, i.e. water vapor, water, water and oil emulsions, solutions, and so forth.

The amines contemplated for use in the present method may be prepared by first reacting a higher alkyl primary amine with acrylonitrile and then hydrogenating the fatty aminopropionitrile thus formed in the presence of a copper nickel carbonate catalyst, under mild hydrogen pressure (100 p.s.i.) and temperature conditions (200° C.).

The reactions which take place in preparing the difatty triamines are represented by the following equations:

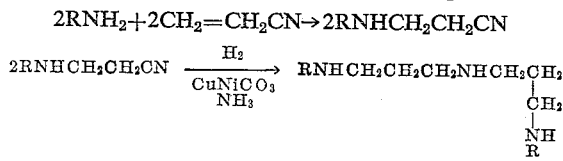

While single isolated primary amines may be used in preparing the previously described difatty triamines, the mixtures of amines obtained by the amination of the mixed fatty acids or selected fractions thereof present in common fats and oils are preferred because of their availability. Typical of such amines are "coco" amine and "tallow" amine which contain fatty groups of from 8 to 22 carbon atoms and which are obtained by the amination of the fatty acids or fractions thereof found in coconut oil and tallow respectively.

The process of the present invention is further illustrated by reference to the following example.

Example

A charge of 530 g. of tallowaminopropionitrile, prepared by reacting primary tallow amine with acrylonitrile, and 11.5 g. of a copper-nickel carbonate hydrogenation catalyst were placed in a one liter high pressure stirred autoclave. The mixture was heated under water pump vacuum to 100° C. using moderate agitation. The system was then put under 100 p.s.i. of hydrogen and heated to 200° C., at which time the pressure was released slowly until only 10–20 p.s.i. remained on the system. Fresh hydrogen was then bubbled through the system at a moderate rate while heating was continued in order to reduce the catalyst to its active form. When a temperature of approximately 230° C. was reached the autoclave was sealed after the hydrogen pressure had been increased to 220 p.s.i. and high speed agitation had been started. After the hydrogenation had started, as indicated by a drop in the pressure, a continuous slow venting of hydrogen was started (rate controlled by the rate of bubbling in a bubble trap attached to the vent line) and fresh hydrogen was introduced to maintain a pressure of approximately 220 p.s.i. within the autoclave. The temperature rose to 250° C. within five minutes due to the exothermic hydrogenation reaction so external heating was stopped. The temperature rose to a maximum of 267° C. within seven minutes, then started to drop. External heating was resumed to maintain the reaction mixture above 225° C. for another 30 minutes. The heating and continuous venting was then stopped, the autoclave was sealed, cooled to room temperature, the pressure was released and the catalyst was removed by filtration. Under these conditions the amino nitrile is converted to the compound in the formula.

The above-described ditallow triamine was tested for its effectiveness as a corrosion inhibitor in a dynamic system. In this test ½ inch by 5 inches 16-gauge mild steel coupons were suspended in a system comprised of 9 parts of water, 1 part of oil, 500 parts per million of $H_2S$ and 5% NaCl. The system was rotated at 2 r.p.m., and maintained at 140° F. for 20 hours. Upon comparison with controls, the ditallow triamine (12%) was found to be 95% effective in inhibiting corrosion at a concentration of 75 p.p.m. in oil and 82% effective when as little as 5 p.p.m. in oil was present.

The embodiments of the invention in which an exclusive property or privilege is claimed are defined as follows:

A process for corrosion inhibition of metallic substances contacted by aqueous media which comprises contacting said substances with a corrosion inhibiting amount of a compound represented by the formula $$RNHCH_2CH_2CH_2NHCH_2CH_2CH_2NHR$$

where R is an aliphatic hydrocarbon group containing 8–22 carbon atoms.

References Cited in the file of this patent
UNITED STATES PATENTS

| | | |
|---|---|---|
| 2,244,712 | Kyrides | June 10, 1941 |
| 2,246,524 | Kyrides | June 24, 1941 |
| 2,736,658 | Pfohl et al. | Feb. 28, 1956 |